US008566773B2

(12) United States Patent
Christo et al.

(10) Patent No.: US 8,566,773 B2
(45) Date of Patent: *Oct. 22, 2013

(54) THERMAL RELIEF AUTOMATION

(75) Inventors: Michael Anthony Christo, Round Rock, TX (US); Julio Alejandro Maldonado, Austin, TX (US); Samuel Wynne Yang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 6633 days.

This patent is subject to a terminal disclaimer.

(21) Appl. No.: 13/397,474

(22) Filed: Feb. 15, 2012

(65) Prior Publication Data

US 2013/0212550 A1 Aug. 15, 2013

(51) Int. Cl.
*G06F 17/50* (2006.01)
(52) U.S. Cl.
USPC ............ 716/133; 716/132; 716/137; 361/748
(58) Field of Classification Search
USPC ........................... 716/132–133, 137; 361/748
See application file for complete search history.

(56) References Cited

U.S. PATENT DOCUMENTS

| | | | | |
|---|---|---|---|---|
| 4,878,155 A | * | 10/1989 | Conley | 361/761 |
| 5,451,720 A | | 9/1995 | Estes et al. | 174/250 |
| 5,473,813 A | * | 12/1995 | Chobot et al. | 29/837 |
| 5,743,004 A | | 4/1998 | Chobot et al. | 29/830 |
| 5,781,447 A | * | 7/1998 | Gerdes | 716/103 |
| 6,075,711 A | | 6/2000 | Brown et al. | 361/761 |
| 6,205,028 B1 | | 3/2001 | Matsumura | 361/720 |
| 6,235,994 B1 | | 5/2001 | Chamberlin et al. | 174/252 |
| 6,291,776 B1 | | 9/2001 | Markovich et al. | 174/262 |
| 6,557,145 B2 | | 4/2003 | Boyle et al. | 716/105 |
| 6,646,886 B1 | * | 11/2003 | Popovich et al. | 361/748 |
| 6,794,950 B2 | * | 9/2004 | du Toit et al. | 333/21 R |
| 6,846,993 B2 | | 1/2005 | Matsui | 174/262 |
| 6,906,414 B2 | * | 6/2005 | Zhao et al. | 257/707 |
| 7,016,200 B2 | | 3/2006 | Schmid et al. | 361/813 |
| 7,096,450 B2 | * | 8/2006 | Gill et al. | 716/115 |
| 7,254,792 B1 | * | 8/2007 | Rekhi et al. | 716/115 |
| 7,361,988 B2 | * | 4/2008 | Morgan et al. | 257/734 |
| 7,409,661 B2 | | 8/2008 | Kang | 716/110 |

(Continued)

OTHER PUBLICATIONS

Rangu, M, et. al. "A Demystifying Study of Thermal Relief Pads: Tradeoff Between Manufacturing and Cooling", 2010 33$^{rd}$ International Spring Seminar on Electronics Technology, May 12-16, 2010, pp. 392-395.

(Continued)

*Primary Examiner* — Naum Levin
(74) *Attorney, Agent, or Firm* — VanLeeuwen & VanLeeuwen; Matthew W. Baca

(57) ABSTRACT

An approach is provided in which a dynamic thermal relief generator retrieves a circuit board file that identifies power plane thru pin locations and a power plane layer. The dynamic thermal relief generator selects one of the power plane thru pin locations and identifies one or more electrical properties corresponding to a component assigned to the selected power plane thru pin location. As such, the dynamic thermal relief generator computes a conductive material exclusion amount based upon the identified electrical properties, which indicates an amount of area to exclude conductive material on the selected power plane layer. In turn, the dynamic thermal relief generator creates a thermal relief pattern based upon the computed conductive material exclusion amount that identifies conductive material voids on the selected power plane layer to exclude the substantially conductive material.

25 Claims, 9 Drawing Sheets

(56) References Cited

U.S. PATENT DOCUMENTS

| | | | |
|---|---|---|---|
| 7,463,122 B2 * | 12/2008 | Kushta et al. | 333/260 |
| 7,490,309 B1 | 2/2009 | Kukal et al. | 716/132 |
| 7,640,523 B1 | 12/2009 | Shi et al. | 716/119 |
| 7,689,945 B2 * | 3/2010 | Hillman et al. | 716/136 |
| 7,703,064 B2 * | 4/2010 | Ashida et al. | 716/137 |
| 7,750,765 B2 | 7/2010 | Kushta et al. | 333/260 |
| 7,805,689 B2 * | 9/2010 | Ueda et al. | 716/118 |
| 8,316,341 B2 * | 11/2012 | Sandy et al. | 716/137 |
| 8,365,131 B2 * | 1/2013 | Koushanfar et al. | 716/132 |
| 8,464,200 B1 * | 6/2013 | Christo et al. | 716/133 |
| 2007/0079275 A1 | 4/2007 | Kang | 716/11 P |
| 2008/0043425 A1 * | 2/2008 | Hebert et al. | 361/687 |
| 2008/0072182 A1 * | 3/2008 | He et al. | 716/2 |
| 2009/0008768 A1 | 1/2009 | Alabin et al. | 257/693 |
| 2011/0147895 A1 | 6/2011 | Bai et al. | 257/618 |
| 2012/0038057 A1 * | 2/2012 | Bartley et al. | 257/774 |
| 2012/0229141 A1 * | 9/2012 | Brown et al. | 324/322 |

OTHER PUBLICATIONS

Plotog, I et. al. "Investigation of the Efficiency of Thermal Relief Shapes on Different Printed Circuit Boards", 2010 IEEE 16th International Symposium for Design and Technology in Electronic Packaging, Sep. 23-26, 2010, pp. 287-290.

Office Action for U.S. Appl. No. 13/397,510 (Christo et al., "Thermal Relief Optimization," filed Feb. 15, 2012), U.S. Patent Trademark Office, mailed Nov. 2, 2012, 9 pages.

* cited by examiner

THERMAL RELIEF AUTOMATION

BACKGROUND

The present disclosure relates to thermal relief automation. More particularly, the present disclosure relates to generating customized thermal relief patterns that create voids in a conductive plane around thru pin locations to improve component pin solderability.

Wave soldering is a large-scale soldering process that solders electronic components on a printed circuit board (PCB) to form an electronic assembly. The components are inserted into or placed on the printed circuit board and the loaded printed circuit board is passed across a pumped wave or waterfall of solder. The solder wets the exposed metallic areas of the board (those not protected with a solder mask), creating a reliable mechanical and electrical connection.

Manufacturers monitor wave flow soldering temperatures to ensure reliable solder joints throughout the printed circuit board. Printed circuit boards include "power thru pin holes" to provide power to the electronic components, which are holes in the printed circuit board that couple to a printed circuit board's power plane layer at "power plane thru pin locations." The power plane layer utilizes a "plane" of electrically conductive material (e.g., copper) to provide a power source to the electronic components on the printed circuit board. Printed circuit boards may include multiple power planes in order to provide multiple voltage levels to the electronic components, such as a +12 Volt power plane, a −12 Volt power plane, a +5 Volt power plane, and a Ground plane.

BRIEF SUMMARY

According to one embodiment of the present disclosure, an approach is provided in which a dynamic thermal relief generator retrieves a circuit board file that identifies power plane thru pin locations and a power plane layer. The dynamic thermal relief generator selects one of the power plane thru pin locations and identifies one or more electrical properties corresponding to a component assigned to the selected power plane thru pin location. As such, the dynamic thermal relief generator computes a conductive material exclusion amount based upon the identified electrical properties, which indicates an amount of area to exclude conductive material on the selected power plane layer. In turn, the dynamic thermal relief generator creates a thermal relief pattern based upon the computed conductive material exclusion amount that identifies conductive material voids on the selected power plane layer to exclude the substantially conductive material.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
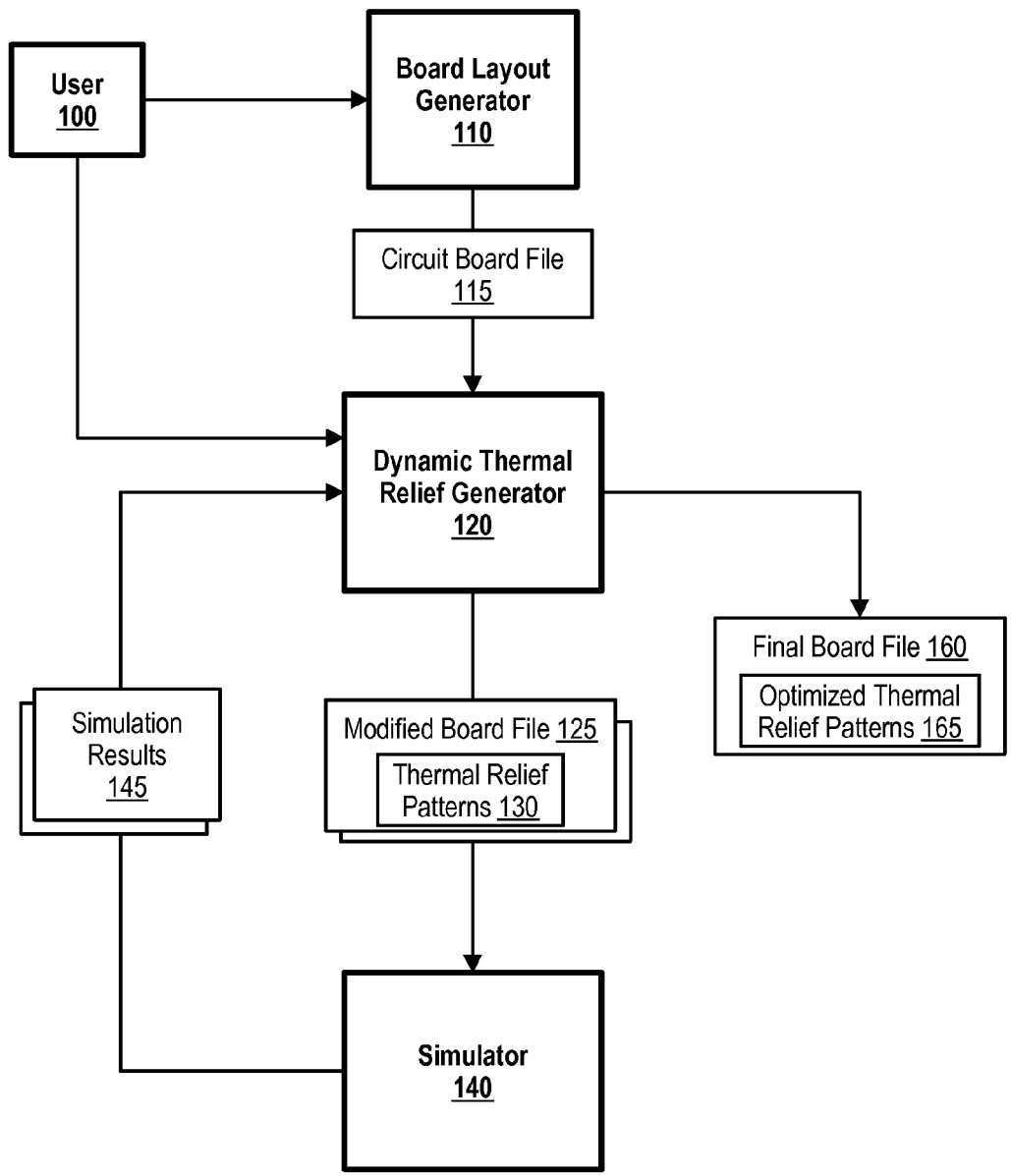
FIG. 1 is a diagram showing a dynamic thermal relief generator creating customized thermal relief patterns and including the customized thermal relief patterns in a circuit board file.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a dynamic thermal relief generator creating customized thermal relief patterns and including the customized thermal relief patterns in a circuit board file. User 100 inputs information into board layout generator 110, such as circuit design information, electronic component information, and board layout information. In turn, board layout generator 110 produces circuit board file 115 (e.g., a routing program board file with a *.brd extension). Circuit board file 115 includes power plane thru pin locations, which identify power thru pin holes on a power plane. For example, a component's power pin may insert into a power thru pin hole that couples to a +12V power plane, which is designated as "layer 7" of in the printed circuit board. In this example, circuit board file 115 includes a power plane thru pin location on layer 7 that identifies the corresponding power thru pin hole.

Since power thru pin holes couple to power plane layers, heat dissipates to the power plane layers during wave flow solder processes, thus reducing the overall temperature of the power thru pin holes. As such, dynamic thermal relief generator 120 creates thermal relief patterns around the power plane thru pin locations. The thermal relief patterns include one or more thermal relief "shapes" that specify conductive material voids around the power plane thru pin location during the board manufacturing process. For example, a thermal relief pattern may include four oval thermal relief shapes that specify four oval areas during the power plane layer manufacturing process to exclude (mask) substantially conductive material. The thermal relief patterns provide a "relief" during wave flow soldering by reducing the amount of heat dissipation along the power plane layer.

The thermal relief patterns, however, are also designed to provide acceptable electrical conductivity between the power plane and a component's power pin in order to minimize fusing and high-power losses. In one embodiment, dynamic thermal relief generator 120 automatically creates and optimizes a thermal relief pattern for each individual power plane thru pin location based upon corresponding electrical properties, thermal properties, and/or board layout properties. In one embodiment, the electrical properties include maximum current and maximum power values; the thermal properties include a maximum temperature value; and the board layout properties include proximate component properties, proximate signal track properties, and proximate thermal relief pattern properties (see FIG. 2 and corresponding text for further details).

Dynamic thermal relief generator 120 includes thermal relief patterns 130 in circuit board file 115 and saves as modified board file 125. As such, dynamic thermal relief generator 120 sends modified board file 125 to simulator 140 for simulation. Simulator 140 simulates modified board file 125 and provides simulation results 145 to dynamic thermal relief generator 120. Simulation results 145 may indicate areas that require dynamic thermal relief generator 120 to adjust one or more thermal relief patterns. For example, a thermal relief pattern may specify a conductive material void on a power plane area that affects a high speed signal track residing on an adjacent substrate layer (e.g., from capacitance changes caused by excluded conductive material).

In one embodiment, depending on where signal tracks run on the adjacent signal layers, dynamic thermal relief generator 120 adjusts thermal relief patterns by auto-rotating the thermal relief shapes and/or deleting one or more of the thermal relief shapes. Once deleted, dynamic thermal relief generator 120 automatically adjusts the size/width of the remaining thermal relief shapes in order to meet the desired parameter input (see FIGS. 3B-3D and corresponding text for further details).

Once dynamic thermal relief generator 120 receives simulation results 145 that pass, dynamic thermal relief generator 120 saves modified board file 125 as final board file 160 (includes optimized thermal relief patterns 165). In turn, user 100 may send final board file 160 to a circuit board manufacturing facility to create the circuit board.

Figure 2:
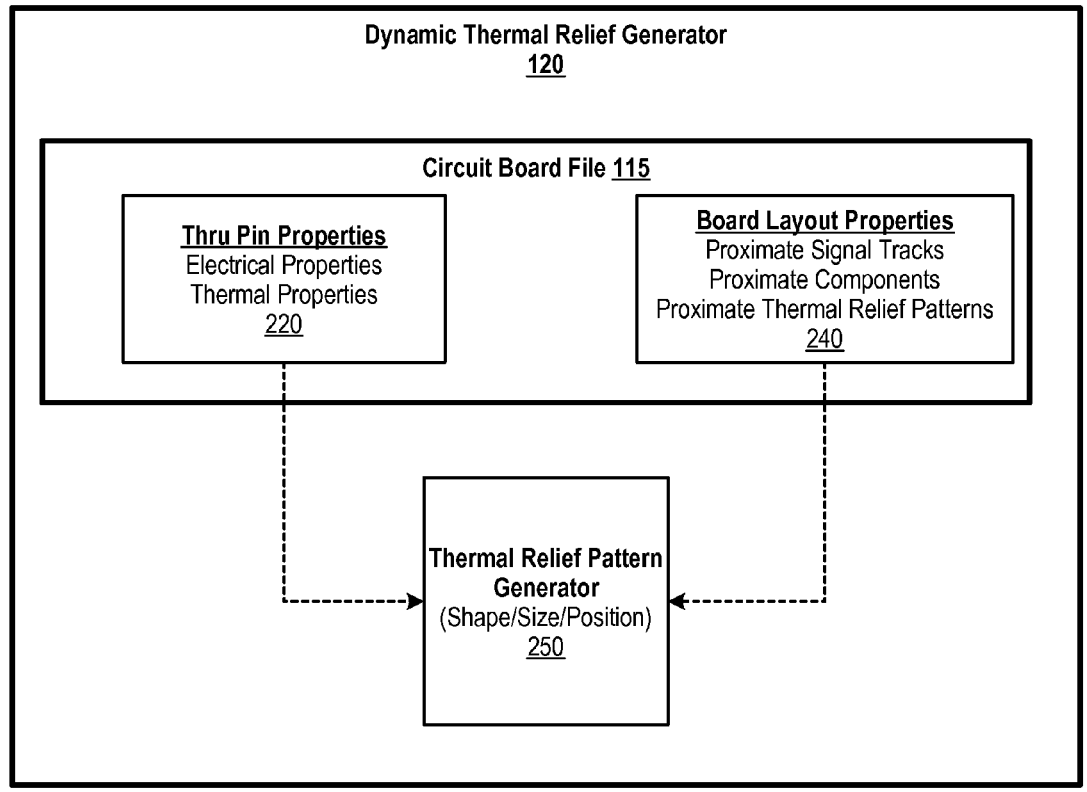
FIG. 2 is a diagram showing a dynamic thermal relief generator utilizing various properties included in a circuit board file to generate individualized thermal relief patterns.

FIG. 2 is a diagram showing a dynamic thermal relief generator utilizing various properties included in a circuit board file to generate individualized thermal relief patterns. Dynamic thermal relief generator 120 loads circuit board file 115 and utilizes pattern generator 250 to generate thermal relief patterns. In one embodiment, pattern generator 250 may be a software routine executing on a processor.

Circuit board file 115 includes thru pin properties 220, which pattern generator 250 utilizes to generate an "initial" thermal relief pattern. Thru pin properties 220 include electrical properties (e.g., maximum current and maximum temperature) and thermal properties (e.g., maximum temperature) that, in one embodiment, correspond to electronic components assigned to the power thru pin holes. For example, a component that requires 12 Volts and 0.3 Amps may be assigned to power thru pin hole "45" and, in this embodiment, thru pin properties 220 includes an entry for power plane thru pin location "45" of 12 Volts and 0.3 Amps.

In one embodiment, after pattern generator 250 generates the initial thermal relief patterns, pattern generator 250 utilizes board layout properties 240 to optimize the initial thermal relief patterns. Board layout properties 240 include information that identifies proximate signal tracks, proximate components, and/or other proximate thermal relief patterns. Thermal relief generator 250 may rotate/resize/reshape the initial thermal relief pattern in response to analyzing board layout properties 240 (see FIGS. 3A, 3B, 3C, and corresponding text for further details).

Figure 3A:
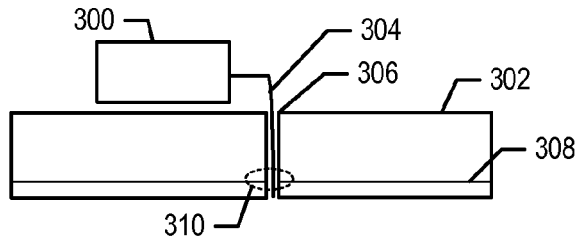
FIG. 3A is a diagram showing an electronic component's power pin inserted in a printed circuit board's power thru pin hole.

FIG. 3A is a diagram showing an electronic component's power pin inserted in a printed circuit board's power thru pin hole. Component 300's power pin 304 inserts into printed circuit board 302's power thru pin hole 306. Printed circuit board 302 includes power plane 308, which provides power to component 300 through power pin 304 at power plane thru pin location 310 when a wave flow solder process fills power pin thru pin hole 306 with solder. The dynamic thermal relief generator creates a thermal relief pattern around power plane thru pin location 310 (creating conductive material voids on power plane 308) in order to maintain a particular temperature during the wave flow solder process.

Figure 3B:
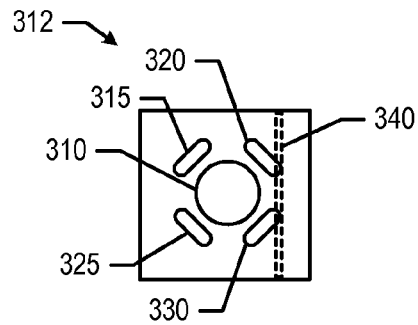
FIG. 3B is a diagram showing an initial thermal relief pattern and a proximate signal line.

FIG. 3B is a diagram showing an initial thermal relief pattern and a proximate signal line. Diagram 312 shows power plane thru pin location 310 and a thermal relief pattern that includes four oval thermal relief shapes (315, 320, 325, 330) on a power plane layer. Proximate signal track 340 resides on an adjacent substrate layer. For example, proximate signal track 340 may reside on substrate layer 5 and the power plane layer may reside on layer 6. As can be seen, proximate signal track 340 travels over thermal relief shapes 320 and 330. As such, conductive material voids that would be produced by thermal relief shapes 320 and 330 during the board manufacturing process may cause capacitance changes along proximate signal track 340. Therefore, the thermal relief generator optimizes the thermal relief pattern accordingly to adjust thermal relief shapes 320 and 330 (see FIGS. 3B, 3C, and corresponding text for further details).

Figure 3C:
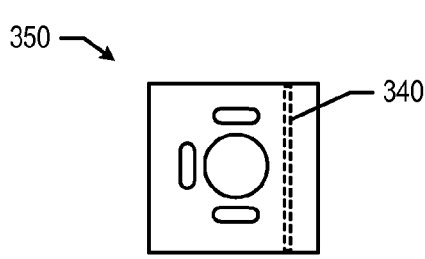
FIG. 3C is a diagram showing a thermal relief pattern with a deleted void and rotated by the dynamic thermal relief generator in order to avoid producing conductive material voids under/over a proximate signal track.

FIG. 3C is a diagram showing a thermal relief pattern that the dynamic thermal relief generator rotates and deletes a thermal relief shape in order to avoid producing conductive material voids under/over a proximate signal track. Diagram 350 shows that the dynamic thermal relief generator rotated the thermal relief pattern shown in FIG. 3B and also removed one of the thermal relief shapes in order to avoid creating conductive material voids under/over proximate signal track 340. In one embodiment, because the dynamic thermal relief generator removed one of the thermal relief shapes, the dynamic thermal relief generator compensates for the lost conductive material void by adjusting the remaining thermal relief shapes (see FIG. 3D and corresponding text for further details).

Figure 3D:
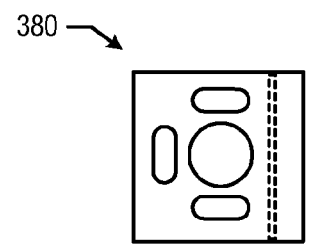
FIG. 3D is a diagram showing an optimized thermal relief pattern with increased thermal relief shape sizes.

FIG. 3D is a diagram showing a rotated thermal relief pattern with increased thermal relief shape sizes. Diagram 380 shows that the dynamic thermal relief generator increased the size of the remaining thermal relief shapes (compared with diagram 350 shown in FIG. 3C) in order to generate conductive material voids on the power plane that produce enough isolation between the power thru pin hole and the power plane to be beneficial during the wave flow soldering process. The size of thermal relief shapes, thus the conductive material voids, is based upon a computed "conductive material exclusion amount" (see FIG. 7 and corresponding text for further details).

Figure 4:
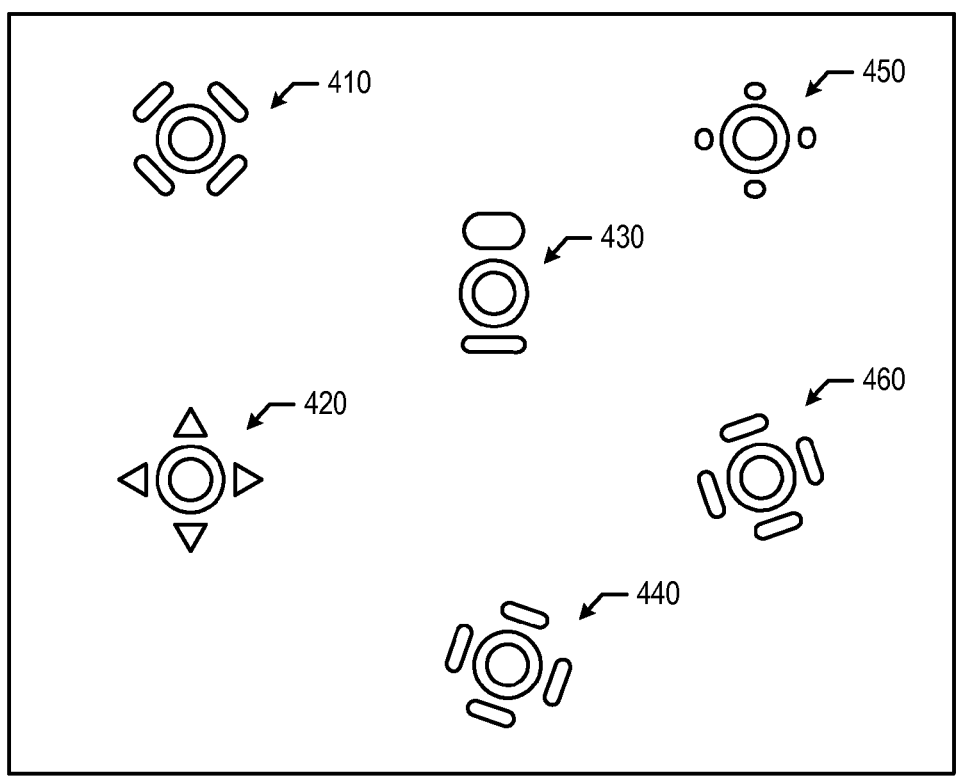
FIG. 4 is a diagram showing a power plane layer that includes individually customized thermal relief patterns.

FIG. 4 is a diagram showing a power plane layer that includes individually customized thermal relief patterns. Power plane layer 400 includes thermal relief patterns 410-460, each corresponding to different power plane thru pin locations. The dynamic thermal relief generator creates customized thermal relief patterns for each power plane thru pin location based upon properties corresponding to, in one embodiment, electronic components that are assigned to the power thru pin holes.

Figure 5:
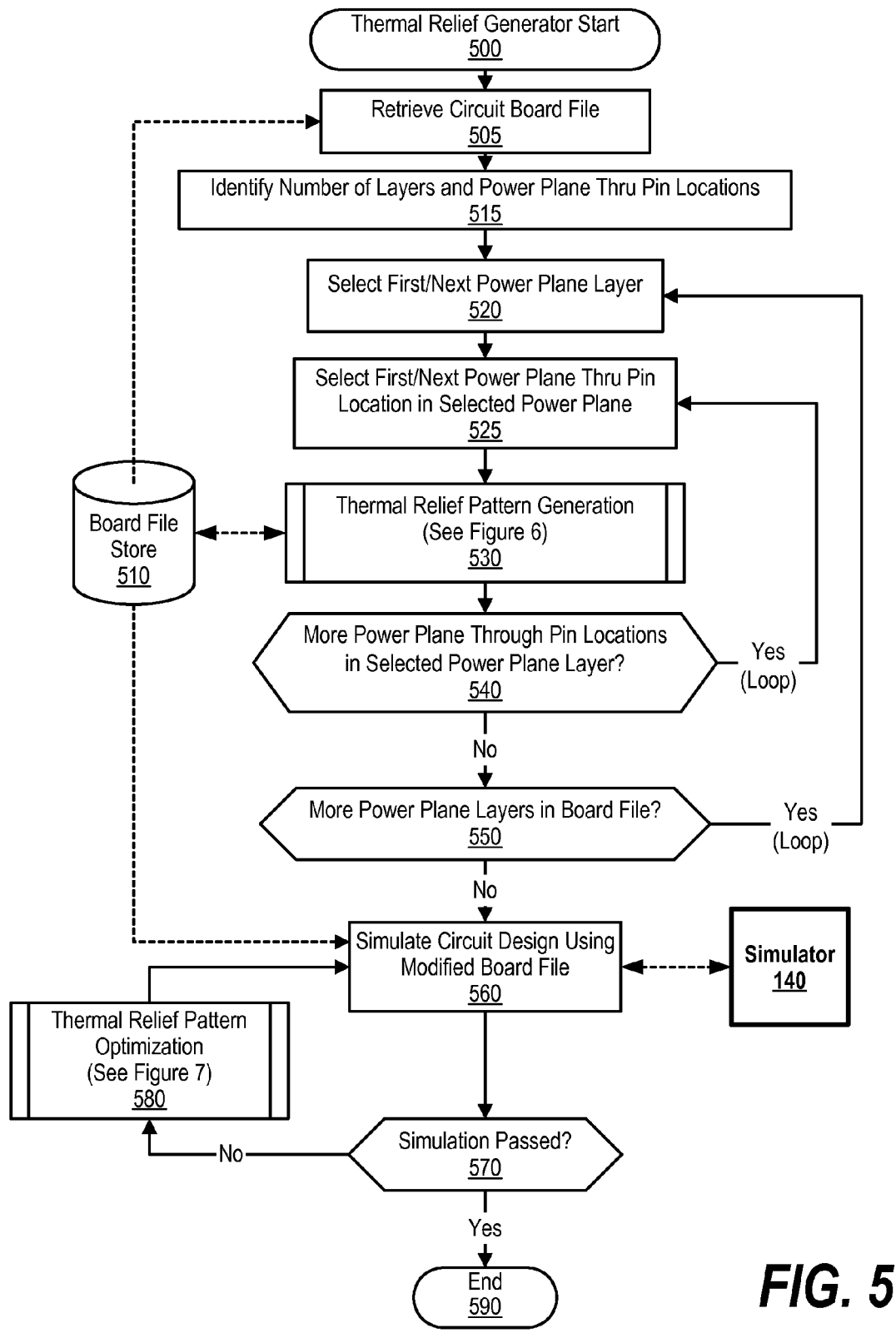
FIG. 5 is a high-level flowchart showing steps taken in generating a thermal relief pattern for power plane thru pin locations.

FIG. 5 is a high-level flowchart showing steps taken in generating a thermal relief pattern for power plane thru pin locations. In one embodiment, the dynamic thermal relief generator generates a custom thermal relief pattern for each power plane thru pin location on each power plane layer. For example, assuming a circuit board file includes five power plane layers, each including 100 power plane thru pin locations, the dynamic thermal relief generator may generate up to 500 different thermal relief patterns based upon various electrical properties, thermal properties, circuit board properties, and signal properties.

Processing commences at 500, whereupon processing retrieves a circuit board file from board file store 510 at step 505. The circuit board file may be, for example, a routing program board file (e.g., *.brd file). At step 515, processing identifies a number of substrate layers and power plane thru pin locations. In one embodiment, processing identifies a total number of layers, which includes both power plane layers and non-power plane layers. In this embodiment, processing may utilize the substrate layer information to identify adjacent substrate layers and corresponding proximate signal tracks. For example, if a power plane layer is on "layer 7," processing may analyze layers 6 and 8 to identify signal tracks (conductive tracks that propagate data signals).

Processing selects a power plane layer at step 520, and selects a power plane thru pin location at step 525. Next, processing generates and optimizes a thermal relief pattern for the selected power plane thru pin location on the selected power plane layer, and stores the thermal relief pattern in board file store 510 (pre-defined process block 530, see FIG. 6 and corresponding text for further details).

A determination is made as to whether there are more power plane thru pin locations in the selected power plane layer to generate a thermal relief pattern (decision 540). If there are more power plane thru pin locations, decision 540 branches to the "Yes" branch, whereupon processing loops back to select the next power plane thru pin. This looping continues until processing generates a thermal relief pattern for each of the power plane thru pins, at which point decision 540 branches to the "No" branch.

A determination is made as to whether there are more power plane layers in the circuit board file to process (decision 550). If there are more power plane layers to process, decision 550 branches to the "Yes" branch, whereupon processing loops back to select the next power plane layer. This looping continues until each power plane thru pin on each power plane layer is processed, at which point decision 540 branches to the "No" branch. As those skilled in the art can appreciate, processing may alternately select a power plane thru pin location and generate a thermal relief pattern for each power plane layer, and then select a different power plane thru pin location and generate thermal relief patterns for each power plane layer for the different power plane thru pin location.

Once thermal relief patterns are generated for each power plane thru pin location and each power plane layer, processing simulates a circuit design utilizing the modified board file. The simulation involves simulating high speed signals and detecting whether the high speed signals are affected by a thermal relief pattern. For example, a signal track may be located on a substrate layer that is adjacent to one of the power planes and travel over a thermal relief pattern that has areas that excludes substantially conductive material (e.g., copper). In this example, a capacitance change may exist at the overlaying area that affects the timing of the high speed signal.

A determination is made as to whether the simulation passed a series of tests (decision 570). If the simulation did not pass, decision 570 branches to the "No" branch, whereupon processing optimizes thermal relief patterns that attributed to the failed simulation. The optimization may include, for example, rotating the thermal relief pattern, changing the thermal relief shapes (e.g., square to oval), resizing the thermal relief shapes, and/or changing the number of thermal relief shapes in the thermal relief pattern (pre-defined process block 580, see FIG. 7 and corresponding text for further details). Processing optimizes thermal relief patterns until the simulation passes, at which point decision 570 branches to the "Yes" branch whereupon processing ends at 590.

Figure 6:
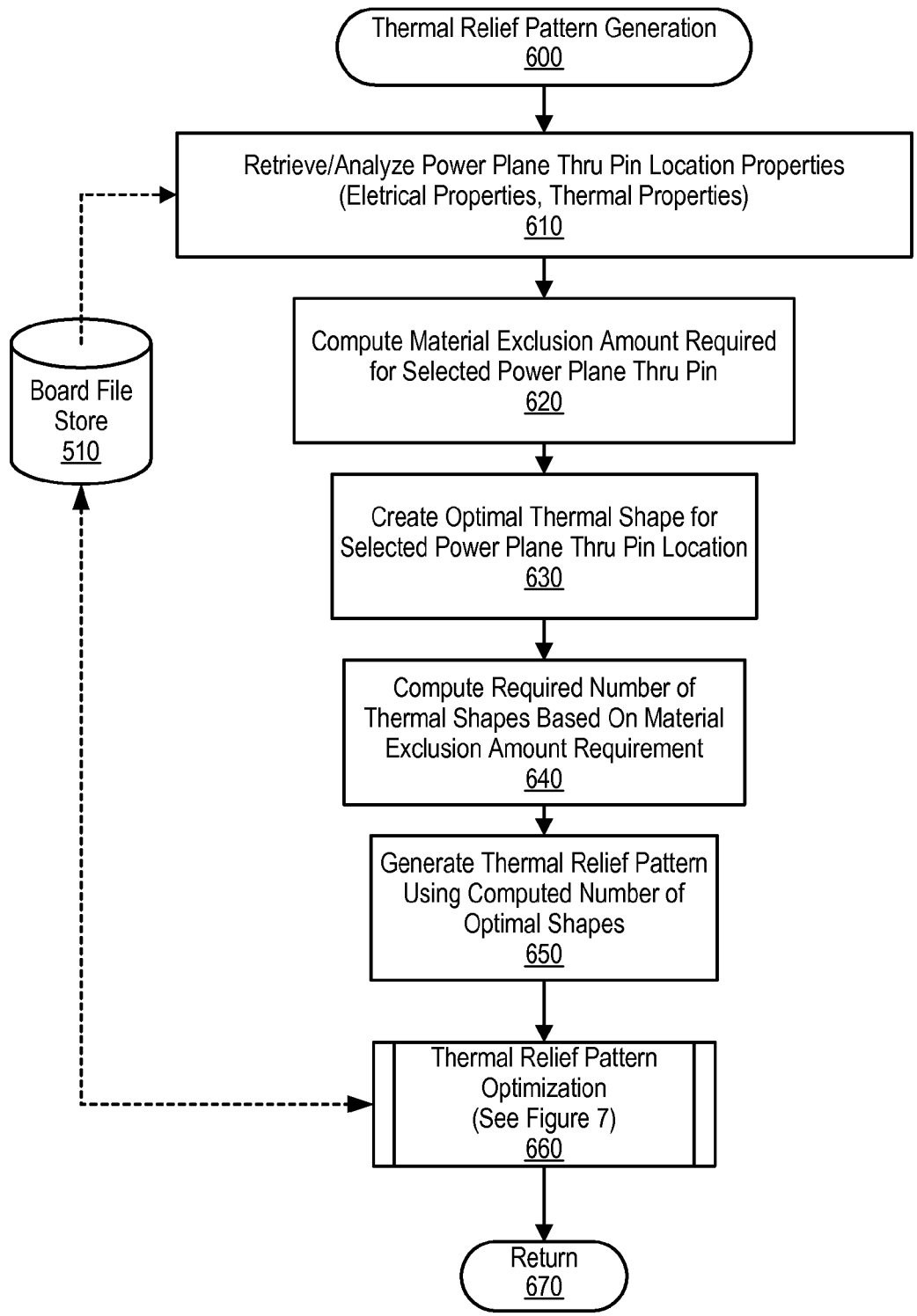
FIG. 6 is a flowchart showing steps taken in creating optimal thermal relief shapes and generating initial thermal relief patterns utilizing the optimal thermal relief shapes.

FIG. 6 is a flowchart showing steps taken in creating optimal thermal relief shapes and generating initial thermal relief patterns utilizing the optimal thermal relief shapes. Processing commences at 600, whereupon processing retrieves and analyzes power plane thru pin properties that correspond to a power plane thru pin location that was selected in FIG. 5 (step 610). In one embodiment, the power plane thru pin properties include electrical properties (e.g., maximum current, maximum power, etc.) and thermal properties (maximum temperature).

At step 620, processing computes a conductive material exclusion amount for the selected power plane thru pin on a selected power plane layer. In one embodiment, the conductive material exclusion amount identifies a total amount of area for which to exclude substantially conductive material in proximity to the power plane thru pin location (e.g., 10 sq. nm).

Next, at step 630, processing creates an optimal thermal shape for the selected power plane thru pin according to, in one embodiment, a predetermined selection hierarchy based on manufacturing standards. The optimal thermal shape identifies a conductive material void, which is an area on the power plane to exclude conductive material during the board manufacturing process. The size of the conductive material void, in one embodiment, is a portion of the overall computed conductive material exclusion amount. For example, the conductive material exclusion amount may be 9 sq. nm. and a conductive material void corresponding to an optimal thermal shape may be 3 sq. nm.

Processing computes a number (quantity) of thermal shapes to include in the thermal relief pattern based upon the overall conductive material exclusion amount compared with the size of the conductive material void (step 640). Using the example described above, the number of thermal shapes required is three (9 sq. nm./3 sq. nm.). At step 650, processing generates a thermal relief pattern using the computed number of the optimal thermal relief shapes (e.g., four oval thermal relief shapes).

Processing proceeds through a series of steps to optimize the thermal relief pattern based upon various board layout properties (e.g., proximate components, proximate signal tracks, proximate thermal relief patterns/shapes, etc.) Thermal Pattern relief optimization may include, for example, rotating the thermal shapes, resizing/reconfiguring the thermal shapes, and/or changing the number of thermal shapes (pre-defined process block 660, see FIG. 7 and corresponding text for further details). Processing returns at 670.

Figure 7:
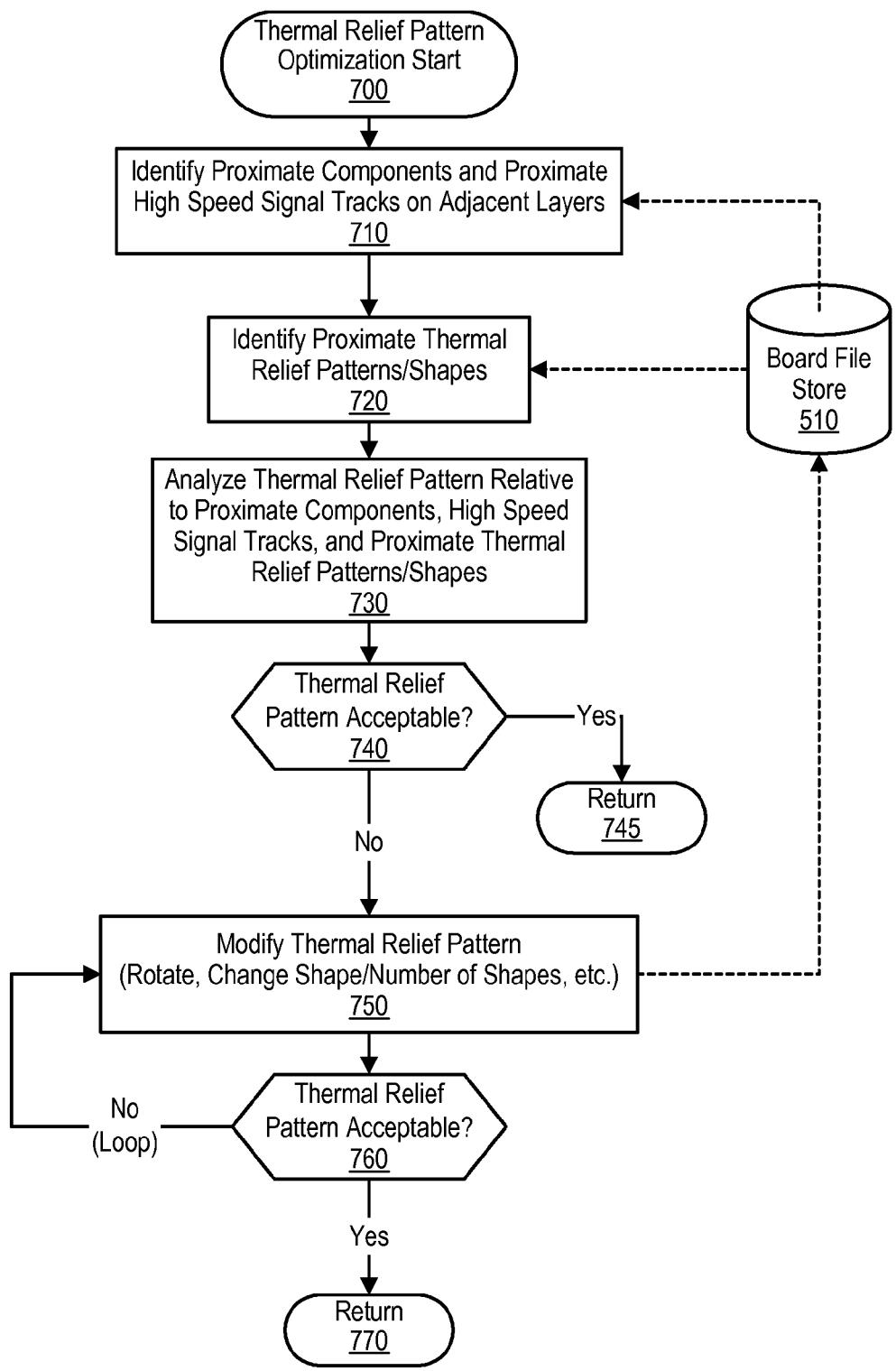
FIG. 7 is a flowchart showing steps taken in optimizing thermal relief patterns.

FIG. 7 is a flowchart showing steps taken in optimizing thermal relief patterns. In one embodiment, the dynamic thermal relief generator optimizes a thermal relief pattern when the thermal relief pattern influences an unacceptable simulation. For example, a signal track carrying a high speed signal may reside in proximity to a conductive material void on an adjacent power plane layer, which may produce noise and/or delay on the high speed signal due to capacitance changes surrounding the conductive material void.

Processing commences at 700, whereupon processing identifies proximate device components and proximate high speed signal tracks that are routed on adjacent substrate layers (step 710). At step 720, processing identifies proximate thermal relief patterns/shapes that correspond to other nearby power plane thru pin locations.

Processing, at step 730, analyzes the thermal relief pattern against the board layout properties identified in steps 710 and 720. In one embodiment, an electronic component corresponding to the power plane thru pin location may be too close to another electronic component. In another embodiment, the electronic component may utilize multiple power plane thru pin locations, in which case processing evaluates overlaps in their corresponding thermal relief patterns.

A determination is made as to whether the thermal relief pattern is acceptable, for example, based upon simulation analysis (decision 740). If the thermal relief pattern is acceptable, decision 740 branches to the "Yes" branch, whereupon processing returns at 745. On the other hand, if the thermal relief pattern is not acceptable, decision 740 branches to the "No" branch, whereupon processing modifies the thermal relief pattern accordingly at step 750.

In one embodiment, processing may compute a rotation angle to rotate the thermal shapes based upon proximate signal tracks in order to avoid all proximate impediments (signals, components, etc. . . . ) while maintaining existing thermal patterns (size and shapes). If this step is not sufficient, processing may analyze adjusting the size of the thermal shapes in order to avoid all proximate impediments. If this step is not sufficient, processing may remove one thermal relief pattern, and then balance out the remaining thermal relief patterns.

A determination is made as to whether the modified thermal relief pattern is acceptable (decision 760). In one embodiment, processing re-simulates the design using the modified thermal relief pattern. If the thermal relief pattern is not acceptable, decision 760 branches to the "No" branch, whereupon processing loops back to further modify the thermal relief pattern.

This looping continues until processing creates a thermal relief pattern that produces acceptable simulation results, at which point decision 760 branches to the "No" branch, whereupon processing returns at 770. In one embodiment when thermal relief patterns are in proximity to each other, processing may concurrently modify both of the thermal relief patterns in order to produce an acceptable result.

Figure 8:
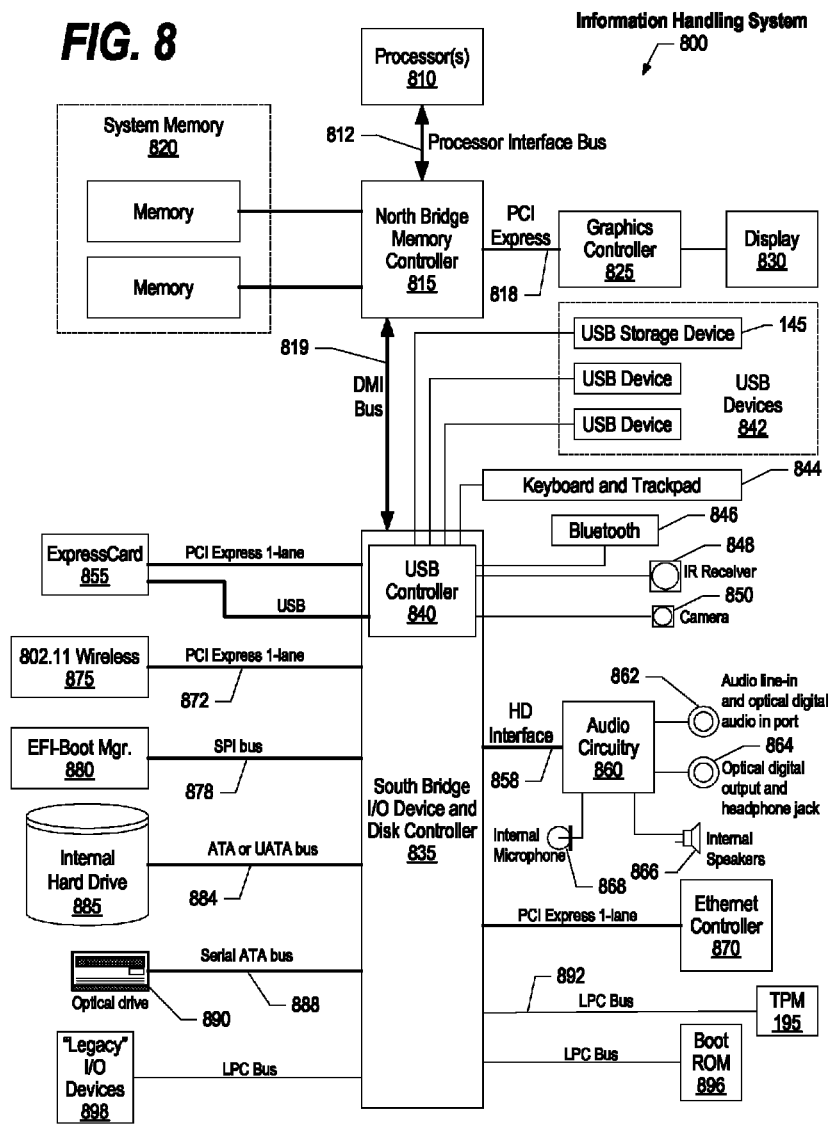
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
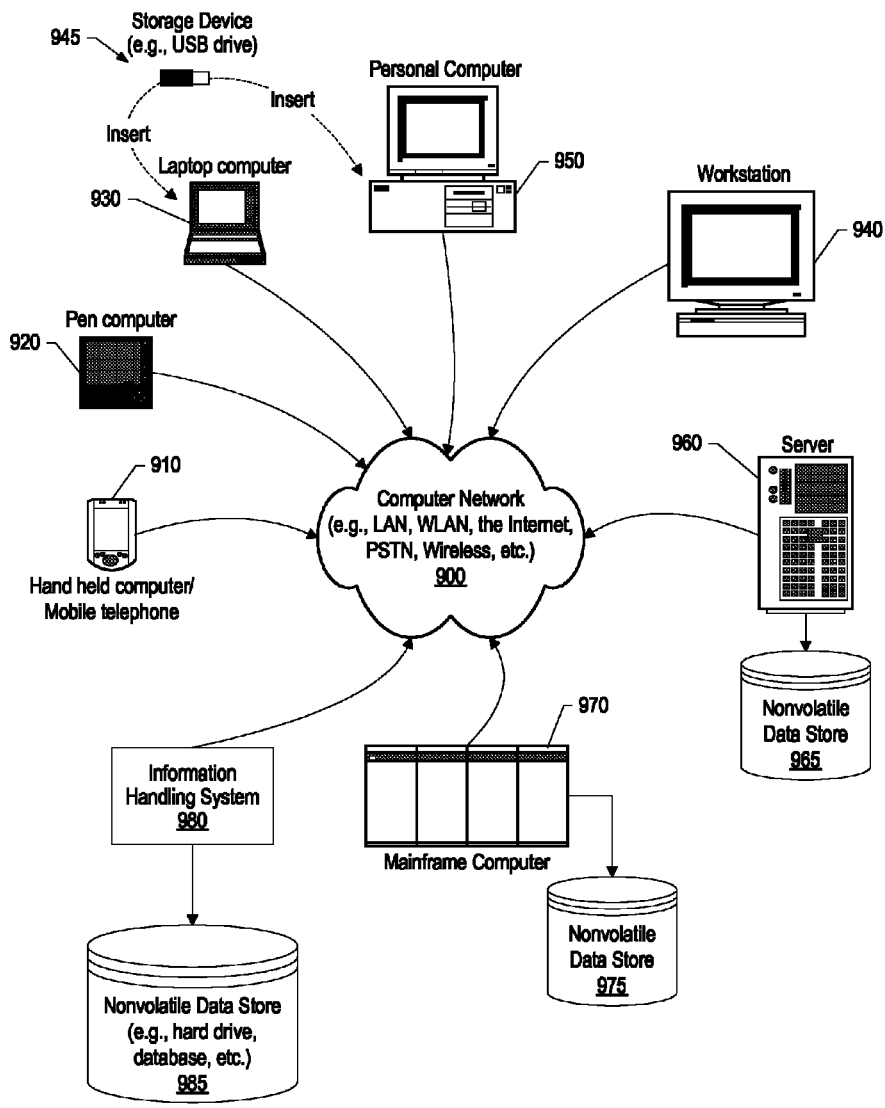
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
    retrieving a circuit board file that identifies a plurality of power plane thru pin locations and one or more power plane layers;
    selecting one of the plurality of power plane thru pin locations and one of the one or more power plane layers;
    identifying one or more electrical properties corresponding to an electronic component assigned to the selected power plane thru pin location;
    computing, by one or more processors, a conductive material exclusion amount based upon the one or more identified electrical properties, wherein the conductive material exclusion amount indicates an amount of area on the selected power plane layer to exclude substantially conductive material;
    creating, by one or more of the processors, a thermal relief pattern based upon the computed conductive material exclusion amount, wherein the thermal relief pattern identifies one or more conductive material voids on the selected power plane layer to exclude the substantially conductive material in proximity to the selected power point thru pin location; and
    adjusting the thermal relief pattern in response to determining that one or more of the conductive material voids affects one or more data signals that propagate along one or more signal tracks in proximity to the selected power plane thru pin location.

2. The method of claim 1 further comprising:
    generating a thermal relief shape utilizing one or more thermal properties that correspond to the selected power plane thru pin location;
    determining a quantity of the thermal relief shapes to include in the thermal relief pattern by comparing one of the conductive material voids with the computed conductive material exclusion amount; and
    including the quantity of the thermal relief shapes in the thermal relief pattern.

3. The method of claim 1 further comprising:
    selecting a different power plane layer from the one or more power plane layers; and
    creating a different thermal relief pattern corresponding to the different power plane layer and the selected power plane thru pin location, wherein the different thermal relief pattern includes one or more different thermal relief shapes that is different than the one or more thermal relief shapes included in the thermal relief pattern.

4. The method of claim 1 further comprising:
    selecting a different power plane thru pin location from the plurality of power plane thru pin locations; and
    creating a different thermal relief pattern corresponding to the different power plane thru pin location and the selected power plane layer, wherein the different thermal relief pattern includes one or more different thermal relief shapes that is different than the one or more thermal relief shapes included in the thermal relief pattern.

5. The method of claim 1 further comprising:
    computing a maximum current density corresponding to the electronic component; and
    utilizing the computed maximum current density as one of the identified electrical properties during the computation of the conductive material exclusion amount.

6. The method of claim 1 further comprising:
    utilizing one or more circuit board properties to compute the conductive material exclusion amount, wherein at least one of the circuit board properties is selected from the group consisting of a proximate device component, a quantity of board layers, and a proximate thermal relief pattern.

7. The method of claim 1 further comprising:
creating a modified circuit board file by including the thermal relief pattern in the circuit board file; and
simulating a circuit design utilizing the modified circuit board file, the simulating indicating that one or more of the conductive material voids affects one or more of the data signals.

8. The method of claim 7 wherein the one or more signal tracks reside on a substrate layer adjacent to the selected power plane layer.

9. An information handling system comprising:
one or more processors;
a memory coupled to at least one of the processors;
a set of computer program instructions stored in the memory and executed by at least one of the processors in order to perform actions of:
  retrieving a circuit board file that identifies a plurality of power plane thru pin locations and one or more power plane layers;
  selecting one of the plurality of power plane thru pin locations and one of the one or more power plane layers;
  identifying one or more electrical properties corresponding to an electronic component assigned to the selected power plane thru pin location;
  computing, by one or more processors, a conductive material exclusion amount based upon the one or more identified electrical properties, wherein the conductive material exclusion amount indicates an amount of area on the selected power plane layer to exclude substantially conductive material;
  creating, by one or more of the processors, a thermal relief pattern based upon the computed conductive material exclusion amount, wherein the thermal relief pattern identifies one or more conductive material voids on the selected power plane layer to exclude the substantially conductive material in proximity to the selected power point thru pin location; and
  adjusting the thermal relief pattern in response to determining that one or more of the conductive material voids affects one or more data signals that propagate along one or more signal tracks in proximity to the selected power plane thru in location.

10. The information handling system of claim 9 wherein the processors perform additional actions comprising:
generating a thermal relief shape utilizing one or more thermal properties that correspond to the selected power plane thru pin location;
determining a quantity of the thermal relief shapes to include in the thermal relief pattern by comparing one of the conductive material voids with the computed conductive material exclusion amount; and
including the quantity of the thermal relief shapes in the thermal relief pattern.

11. The information handling system of claim 9 wherein the processors perform additional actions comprising:
selecting a different power plane layer from the one or more power plane layers; and
creating a different thermal relief pattern corresponding to the different power plane layer and the selected power plane thru pin location, wherein the different thermal relief pattern includes one or more different thermal relief shapes that is different than the one or more thermal relief shapes included in the thermal relief pattern.

12. The information handling system of claim 9 wherein the processors perform additional actions comprising:
selecting a different power plane thru pin location from the plurality of power plane thru pin locations; and
creating a different thermal relief pattern corresponding to the different power plane thru pin location and the selected power plane layer, wherein the different thermal relief pattern includes one or more different thermal relief shapes that is different than the one or more thermal relief shapes included in the thermal relief pattern.

13. The information handling system of claim 9 wherein the processors perform additional actions comprising:
computing a maximum current density corresponding to the electronic component; and
utilizing the computed maximum current density as one of the identified electrical properties during the computation of the conductive material exclusion amount.

14. The information handling system of claim 9 wherein the processors perform additional actions comprising:
utilizing one or more circuit board properties to compute the conductive material exclusion amount, wherein at least one of the circuit board properties is selected from the group consisting of a proximate device component, a quantity of board layers, and a proximate thermal relief pattern.

15. The information handling system of claim 9 wherein the processors perform additional actions comprising:
creating a modified circuit board file by including the thermal relief pattern in the circuit board file; and
simulating a circuit design utilizing the modified circuit board file, the simulating indicating that one or more of the conductive material voids affects one or more of the data signals.

16. The information handling system of claim 15 wherein the one or more signal tracks reside on a substrate layer adjacent to the selected power plane layer.

17. A computer program product stored in a computer readable storage device, comprising computer program code that, when executed by an information handling system, causes the information handling system to perform actions comprising:
retrieving a circuit board file that identifies a plurality of power plane thru pin locations and one or more power plane layers;
selecting one of the plurality of power plane thru pin locations and one of the one or more power plane layers;
identifying one or more electrical properties corresponding to an electronic component assigned to the selected power plane thru pin location;
computing, by one or more processors, a conductive material exclusion amount based upon the one or more identified electrical properties, wherein the conductive material exclusion amount indicates an amount of area on the selected power plane layer to exclude substantially conductive material;
creating, by one or more of the processors, a thermal relief pattern based upon the computed conductive material exclusion amount, wherein the thermal relief pattern identifies one or more conductive material voids on the selected power plane layer to exclude the substantially conductive material in proximity to the selected power point thru pin location; and
adjusting the thermal relief pattern in response to determining that one or more of the conductive material voids affects one or more data signals that propagate along one or more signal tracks in proximity to the selected power plane thru pin location.

18. The computer program product of claim 17 wherein the information handling system performs further actions comprising:
generating a thermal relief shape utilizing one or more thermal properties that correspond to the selected power plane thru pin location;
determining a quantity of the thermal relief shapes to include in the thermal relief pattern by comparing one of the conductive material voids with the computed conductive material exclusion amount; and
including the quantity of the thermal relief shapes in the thermal relief pattern.

19. The computer program product of claim 17 wherein the information handling system performs further actions comprising:
selecting a different power plane layer from the one or more power plane layers; and
creating a different thermal relief pattern corresponding to the different power plane layer and the selected power plane thru pin location, wherein the different thermal relief pattern includes one or more different thermal relief shapes that is different than the one or more thermal relief shapes included in the thermal relief pattern.

20. The computer program product of claim 17 wherein the information handling system performs further actions comprising:
selecting a different power plane thru pin location from the plurality of power plane thru pin locations; and
creating a different thermal relief pattern corresponding to the different power plane thru pin location and the selected power plane layer, wherein the different thermal relief pattern includes one or more different thermal relief shapes that is different than the one or more thermal relief shapes included in the thermal relief pattern.

21. The computer program product of claim 17 wherein the information handling system performs further actions comprising:
computing a maximum current density corresponding to the electronic component; and
utilizing the computed maximum current density as one of the identified electrical properties during the computation of the conductive material exclusion amount.

22. The computer program product of claim 17 wherein the information handling system performs further actions comprising:
utilizing one or more circuit board properties to compute the conductive material exclusion amount, wherein at least one of the circuit board properties is selected from the group consisting of a proximate device component, a quantity of board layers, and a proximate thermal relief pattern.

23. The computer program product of claim 17 wherein the information handling system performs further actions comprising:
creating a modified circuit board file by including the thermal relief pattern in the circuit board file; and
simulating a circuit design utilizing the modified circuit board file, the simulating indicating that one or more of the conductive material voids affects one or more of the data signals.

24. The computer program product of claim 23 wherein the one or more signal tracks reside on a substrate layer adjacent to the selected power plane layer.

25. A computer-implemented method comprising:
retrieving a circuit board file that identifies a plurality of power plane thru pin locations and one or more power plane layers;
selecting one of the plurality of power plane thru pin locations and one of the one or more power plane layers;
identifying one or more electrical properties corresponding to an electronic component assigned to the selected power plane thru pin location;
computing a maximum current density corresponding to the electronic component;
computing, by one or more processors, a conductive material exclusion amount based upon the computed maximum current density, wherein the conductive material exclusion amount indicates an amount of area on the selected power plane layer to exclude substantially conductive material;
generating a thermal relief shape utilizing one or more thermal properties that correspond to the selected power plane thru pin location, wherein the thermal relief shape identifies a conductive material void on the selected power plane layer to exclude the substantially conductive material in proximity to the selected power point thru pin location;
determining a quantity of the thermal relief shapes to include in a thermal relief pattern by comparing the conductive material voids with the computed conductive material exclusion amount; creating, by one or more of the processors, a thermal relief pattern utilizing the quantity of thermal relief shapes; and
adjusting the thermal relief pattern in response to determining that one or more of the conductive material voids affects one or more data signals that propagate along one or more signal tracks in proximity to the selected power plane thru pin location.

* * * * *